(12) United States Patent
Bry et al.

(10) Patent No.: US 10,746,481 B2
(45) Date of Patent: Aug. 18, 2020

(54) THERMAL BATTERY WITH ENCAPSULATED PHASE-CHANGE MATERIAL

(71) Applicant: Valeo Systemes Thermiques, Le Mesnil Saint-Denis (FR)

(72) Inventors: Samuel Bry, Laval (FR); Patrick Boisselle, Laval (FR); Kamel Azzouz, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 48 days.

(21) Appl. No.: 15/546,025

(22) PCT Filed: Jan. 26, 2016

(86) PCT No.: PCT/EP2016/051597
§ 371 (c)(1),
(2) Date: Jul. 25, 2017

(87) PCT Pub. No.: WO2016/120283
PCT Pub. Date: Aug. 4, 2016

(65) Prior Publication Data
US 2018/0017338 A1   Jan. 18, 2018

(30) Foreign Application Priority Data
Jan. 26, 2015   (FR) ...................................... 15 50582

(51) Int. Cl.
*F28D 20/02* (2006.01)
*F28F 9/013* (2006.01)

(52) U.S. Cl.
CPC ......... *F28D 20/021* (2013.01); *F28D 20/023* (2013.01); *F28F 9/013* (2013.01); *F28F 2240/00* (2013.01); *Y02E 60/145* (2013.01)

(58) Field of Classification Search
CPC ...... F28D 20/021; F28D 20/023; F28F 9/013; F28F 2240/00; Y02E 60/145
See application file for complete search history.

(56) References Cited

U.S. PATENT DOCUMENTS 4,250,958 A  *  2/1981  Wasserman ............. F28D 20/02
                                                      126/618
4,403,645 A  *  9/1983  MacCracken ......... F28D 20/021
                                                      126/641
(Continued)

FOREIGN PATENT DOCUMENTS

DE     3005510 A1    8/1981
EP     2149770 A2    2/2010
(Continued)

OTHER PUBLICATIONS

International Search Report issued in corresponding application No. PCT/EP2016/051597 dated Apr. 7, 2016 (6 pages).
(Continued)

*Primary Examiner* — Ljiljana V. Ciric
(74) *Attorney, Agent, or Firm* — Osha Liang LLP

(57) ABSTRACT

A thermal battery having an enclosure including a fluid inlet and outlet. Between the inlet and outlet are tubes of encapsulated phase-change material. The tubes are arranged parallel to each other, and include radial spacers for spacing the tubes apart, such that the radial spacers of each of any two given contiguous tubes are longitudinally and radially offset from one another so as to allow fluid to circulate.

11 Claims, 1 Drawing Sheet

(56) References Cited

U.S. PATENT DOCUMENTS

Figure 1:
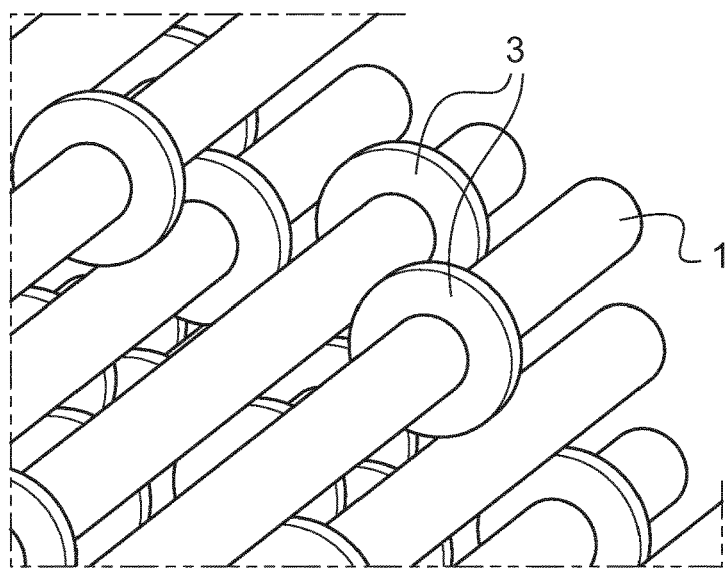

| | | | | |
|---|---|---|---|---|
| 4,556,100 A | * | 12/1985 | Whitman | F28D 20/02 |
| | | | | 126/619 |
| 5,060,718 A | * | 10/1991 | Capilli | F24D 3/147 |
| | | | | 165/56 |
| 5,239,839 A | * | 8/1993 | James | F25D 3/005 |
| | | | | 126/400 |
| 9,255,740 B2 | * | 2/2016 | Bellenfant | B60H 1/00328 |
| 9,970,715 B2 | * | 5/2018 | Howes | F28D 20/0056 |
| 2007/0029064 A1 | * | 2/2007 | Baginski | F28D 20/026 |
| | | | | 165/10 |
| 2009/0294094 A1 | * | 12/2009 | Suzuki | F28D 20/023 |
| | | | | 165/10 |
| 2010/0276121 A1 | * | 11/2010 | Sagie | F28D 7/1607 |
| | | | | 165/110 |
| 2011/0253341 A1 | | 10/2011 | Al-Otaibi et al. | |
| 2012/0279679 A1 | * | 11/2012 | Soukhojak | B60H 1/00492 |
| | | | | 165/10 |
| 2014/0138042 A1 | * | 5/2014 | Yagi | B60L 1/02 |
| | | | | 165/10 |
| 2014/0284020 A1 | * | 9/2014 | Amir | F28D 15/02 |
| | | | | 165/10 |
| 2015/0224850 A1 | * | 8/2015 | Bank | B60H 1/00492 |
| | | | | 392/340 |
| 2017/0219294 A1 | * | 8/2017 | Longis | F24H 7/0216 |
| 2018/0017338 A1 | * | 1/2018 | Bry | F28F 9/013 |
| 2018/0017339 A1 | * | 1/2018 | Bry | F28F 9/0135 |
| 2019/0137190 A1 | * | 5/2019 | Novoselac | F28F 1/045 |

FOREIGN PATENT DOCUMENTS

| | | |
|---|---|---|
| WO | 2011/019314 A2 | 2/2011 |
| WO | 2012/151096 A2 | 11/2012 |
| WO | 2013/075198 A1 | 5/2013 |
| WO | 2013/160951 A1 | 10/2013 |

OTHER PUBLICATIONS

Written Opinion of the International Searching Authority issued in corresponding application No. PCT/EP2016/051597 dated Apr. 7, 2016 (5 pages).

* cited by examiner

THERMAL BATTERY WITH ENCAPSULATED PHASE-CHANGE MATERIAL

The present invention relates to the field of thermal batteries and more specifically of thermal batteries comprising a phase-change material.

Thermal batteries are generally used for heating the vehicle interior, notably in electric and hybrid vehicles or for preheating a heat-transfer fluid in a thermal management circuit. Thermal batteries may also be used for preheating the engine oil or the automatic transmission fluid of vehicles with an internal combustion engine.

A thermal battery with phase-change materials generally comprises an enclosure forming a reservoir inside which the phase-change material is placed, generally in encapsulated form. The performance of the thermal battery is thus dependent on the quantity of phase-change material that it is able to contain, coupled with the need for the fluid to circulate within the reservoir with the lowest possible pressure drops.

One of the objects of the present invention is therefore to at least partially overcome the disadvantages of the prior art and to propose an improved thermal battery.

The present invention therefore relates to a thermal battery comprising an enclosure comprising a fluid inlet and outlet and comprising within it tubes of encapsulated phase-change material, said tubes being arranged parallel to the circulating flow of fluid, said tubes comprising radial spacers for spacing said tubes apart.

The radial spacers allow the tubes to be separated and held a certain distance apart so that the fluid can circulate between the tubes.

According to one aspect of the invention, the radial spacers of two contiguous tubes have a position that is offset from one another so as to allow the fluid to circulate.

According to another aspect of the invention, the radial spacers are formed as an integral part of the wall of the tubes.

According to another aspect of the invention, the radial spacers are attached washers through the inside of which said tubes pass.

According to another aspect of the invention, the washers are fixed to the tubes.

According to another aspect of the invention, the washers of one and the same tube are held a distance apart by means of at least one spacer.

According to another aspect of the invention, the spacer is a sleeve surrounding the tube.

According to another aspect of the invention, the washers are formed as an integral part of the sleeve.

According to another aspect of the invention, the spacer comprises at least two rods arranged and fixed between the washers.

Figure 2:
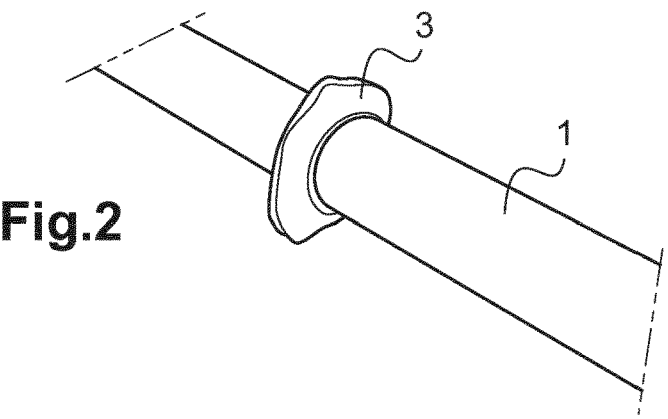
Figure 3:
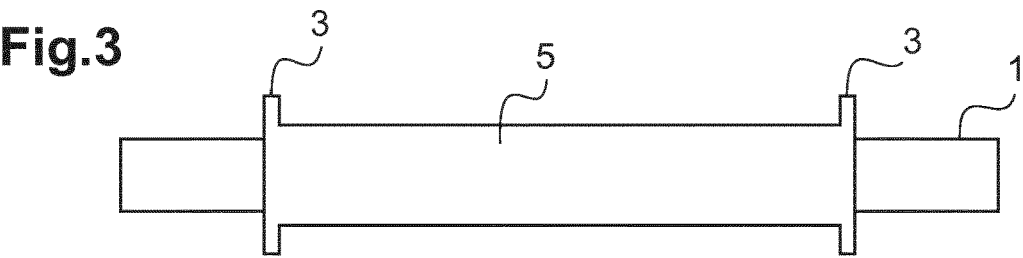
Figure 4:
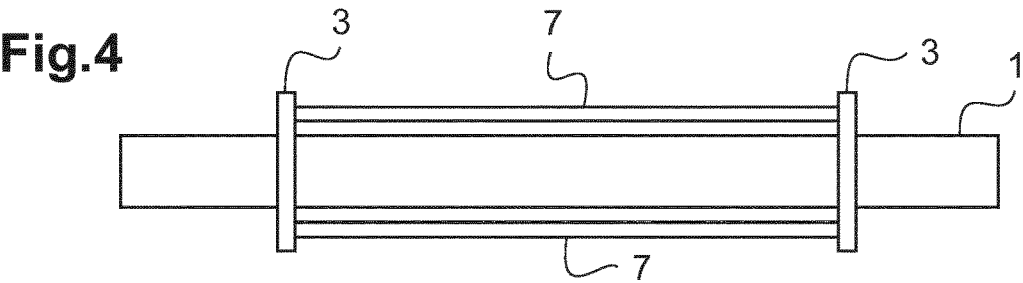

Further features and advantages of the invention will become more clearly apparent from reading the following description, given by way of nonlimiting illustrative example, and from the appended drawings, in which:

FIG. 1 is a schematic perspective depiction of tubes of encapsulated phase-change material within a thermal battery, FIG. 2 is a schematic perspective depiction of a tube of encapsulated phase-change material according to a first embodiment, FIG. 3 is a schematically depicted side view of a tube of encapsulated phase-change material according to a second embodiment, FIG. 4 is a schematically depicted side view of a tube of encapsulated phase-change material according to a third embodiment.

In the various figures, identical elements bear the same reference numbers.

FIG. 1 is a schematic depiction of tubes 1 of phase-change material arranged parallel to one another and intended to be arranged within a thermal battery. Such a thermal battery comprises an enclosure (not depicted) which comprises a fluid inlet and a fluid outlet. The tubes 1 are arranged parallel to the circulating flow of said fluid. The tubes 1 of phase-change material comprise a tubular wall, preferably made of plastic, for example of polycarbonate, inside which a phase-change material is arranged. The tubular wall is then sealed fluidtightly at its ends.

The tubes 1 comprise radial spacers 3 for spacing said tubes 1 apart. These radial spacers 3 allow the tubes 1 to be separated and held a certain distance apart so that the fluid can circulate between the tubes 1.

The radial spacers 3 are preferably circular and each tube 1 comprises at least one circular radial spacer 3 completely surrounding it.

As FIG. 1 shows, the radial spacers 3 of two contiguous tubes 1 have a position that is offset relative to one another along their respective tube 1 so as to allow the fluid to circulate within the thermal battery without thereby increasing pressure drops.

According to a first embodiment illustrated in FIG. 2, the radial spacers 3 may form an integral part of the wall of the tubes 1. The spacers may thus be produced directly during production of the tube 1 of phase-change material, for example by hot deformation of the wall of said tube 1.

According to a second embodiment illustrated in FIGS. 3 and 4, the radial spacers 3 may be attached washers 3 through the inside of which said tubes 1 pass.

These washers 3 may be fixed to the tubes 1, for example by bonding or even welding.

Alternatively, the washers 3 may be simply slipped over the tubes 1 and the washers 3 situated on one and the same tube 1 may be held a distance apart by at least one spacer. The fact that the washers 3 are held in place is necessary in order to prevent them from moving along the tubes 1 as a result of the circulation of the fluid in the thermal battery.

As FIG. 3 shows, the spacer between the washers 3 of one and the same tube 1 may be a sleeve 5 surrounding said tube 1. The washers 3 may form an integral part of said sleeve 5 or alternatively it may simply be arranged between two independent washers 3.

Alternatively still, and as FIG. 4 shows, the spacer between the washers 3 of one and the same tube 1 may comprise at least two rods 7 arranged and fixed between the washers 3.

Thus, it may be clearly seen that the thermal battery according to the invention, because of the presence of the radial spacers 3 between the tubes 1 of encapsulated phase-change material, allows better circulation of the fluid between said tubes 1.

The invention claiimed is:

1. A thermal battery comprising:
   an enclosure comprising:
      a fluid inlet and outlet; and
      a plurality of tubes of encapsulated phase-change material, said plurality of tubes being arranged parallel to each other, wherein said plurality of tubes are spaced apart by one or more radial spacers,
      wherein the one or more radial spacers of each of any two given contiguous tubes of the plurality of tubes are longitudinally and radially offset from one another so as to allow fluid to circulate.

2. The thermal battery as claimed in claim 1, wherein the one or more radial spacers form an integral part of a wall of the plurality of tubes.

3. The thermal battery as claimed in claim 1, wherein the one or more radial spacers are attached to one or more washers through which said plurality of tubes pass.

4. The thermal battery as claimed in claim 3, wherein the one or more washers are fixed to the plurality of tubes.

5. The thermal battery as claimed in claim 3, wherein the one or more washers of one of the plurality of tubes are held a distance apart by means of at least one spacer.

6. The thermal battery as claimed in claim 5, wherein the at least one spacer comprises at least two rods arranged and fixed between the one or more washers.

7. The thermal battery as claimed in claim 5, wherein the at least one spacer is a sleeve surrounding the one of the plurality of tubes.

8. The thermal battery as claimed in claim 7, wherein the one or more washers form an integral part of the sleeve.

9. A thermal battery comprising:
    an enclosure comprising:
        a fluid inlet and outlet; and
        a plurality of tubes of encapsulated phase-change material, said plurality of tubes being arranged parallel to each other wherein said plurality of tubes are spaced apart by one or more radial spacers which form an integral part of a wall of the plurality of tubes and wherein the one or more radial spacers of each of any two given contiguous tubes of the plurality of tubes are longitudinally and radially offset from one another so as to allow fluid to circulate.

10. The thermal battery as claimed in claim 9, wherein the one or more radial spacers are attached to one or more washers through which said plurality of tubes pass.

11. The thermal battery as claimed in claim 10, wherein the one or more washers are fixed to the plurality of tubes.

\* \* \* \* \*